Aug. 26, 1924.　　　　　　　　　　　　　　　　1,506,418
E. G. EVENSTA ET AL
TEST PLUG
Filed Feb. 26, 1923
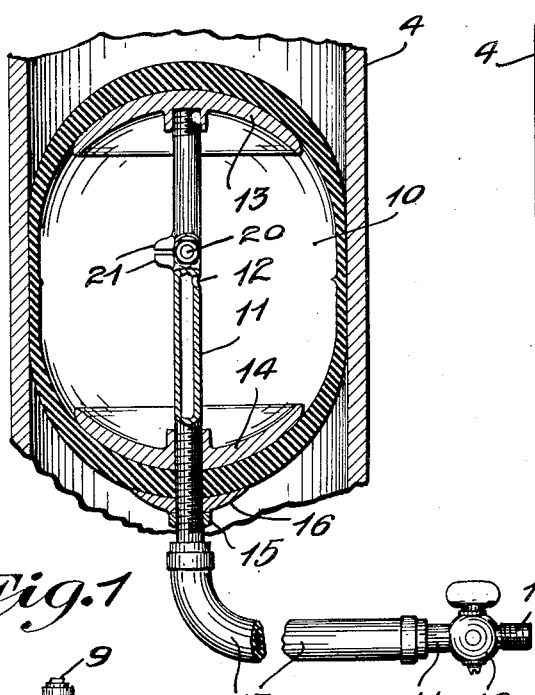
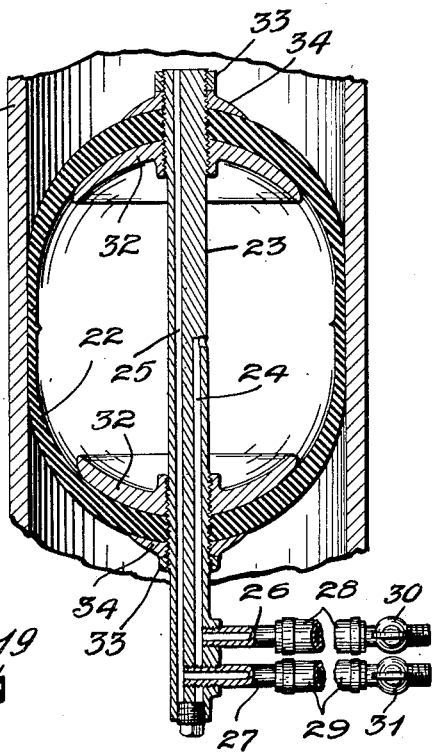
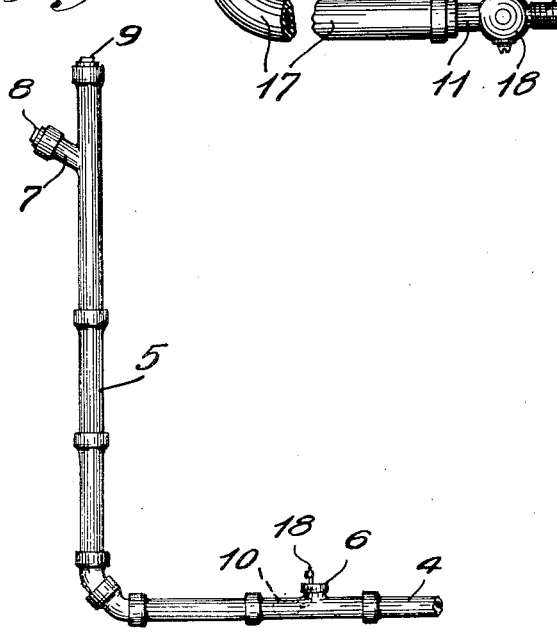
Inventors
Edwin G. Evensta
Henry J. Anderson
By their Attorneys
Merchant & Kilgore

Patented Aug. 26, 1924.

1,506,418

UNITED STATES PATENT OFFICE.

EDWIN G. EVENSTA AND HENRY J. ANDERSON, OF MINNEAPOLIS, MINNESOTA, ASSIGNORS TO E-Z MANUFACTURING CO., OF MINNEAPOLIS, MINNESOTA, A CORPORATION OF MINNESOTA.

TEST PLUG.

Application filed February 26, 1923. Serial No. 621,232.

*To all whom it may concern:*

Be it known that we, EDWIN G. EVENSTA and HENRY J. ANDERSON, citizens of the United States, residing at Minneapolis, in the county of Hennepin and State of Minnesota, have invented certain new and useful Improvements in Test Plugs; and we do hereby declare the following to be a full, clear, and exact description of the invention, such as will enable others skilled in the art to which it appertains to make and use the same.

Our invention provides an extremely simple and highly efficient test plug for use in testing plumbing for leaks.

To this end, the invention consists of the novel devices and combinations of the devices hereinafter described and defined in the claim.

In the accompanying drawings, which illustrate the invention, like characters indicate like parts throughout the several views.

Referring to the drawings:

Fig. 1 is an elevation of a sectional soil pipe and stack, and in which soil pipe is applied one form of the test plug;

Fig. 2 is a fragmentary view principally in section showing the soil pipe and test plug on an enlarged scale; and Fig. 3 is a view corresponding to Fig. 2 but showing another form of the test plug.

The numeral 4 indicates a soil pipe which leads from the lower end of a stack 5, and which soil pipe and stack are made up of the customary iron pipe sections, the joints of which are calked and sealed in the customary manner to form air and water joints. As shown, one of the sections of the soil pipe 4 is provided with a lateral opening 6 which may be used as a clean-out, or in which may be secured a drain or other pipe. The top section of the stack 5 is in the form of a T, and the branch thereof is indicated by the numeral 7 and closed by a plug 8. The stack 5 is temporarily closed by a plug 9 which, after the work has been completed, will be removed, and the upper end of said stack covered by a cap.

In Fig. 1 the test plug shown in Fig. 2 is placed in the soil pipe 4 above the opening 6 to seal said soil pipe and permit a test to be made between said test plug and the top of the stack. These tests may be made in various different ways, and are ordinarily made by an apparatus including a pump for pumping air into the section to be tested under a certain pressure, and which apparatus also includes a pressure gauge. Such an apparatus may be attached to the section to be tested through a clean-out T or other opening.

The test plug shown in Fig. 2 includes a rubber bulb 10 into which extends one end of an air-charging tube 11 having a port 12 which opens into said bulb. Applied to the tube 11 within the bulb 10 are two segmental heads 13 and 14 which hold the ends of the bulb 10 properly spaced. These heads 13 and 14 are attached to the tube 11 by means of screw threads, and the end of the bulb, at the head 14, is clamped thereon by a nut 15 and washer 16 having screw-threaded engagement with the outer projecting end of the tube 11. This tube 11, outward of the bulb 10, has interposed therein a flexible hose section 17. Applied to the outer end of the tube 11 is a controlling valve 18 which is provided with a screw-threaded nipple 19 to which may be attached the hose of an air pump or other apparatus for expanding the bulb 10 within the soil pipe 4 and cause the same, between the heads 13 and 14, to be tightly pressed against the interior of the soil pipe 4 and thereby form an air and water-tight joint.

To permit the bulb 10 to be inserted through a relatively small lateral opening and then turned into the pipe in which it is to be applied, the air charging tube 11, between the port 12 and head 13, is provided with a hinge joint 20. Cooperating stop lugs 21 on the two sections of the tube 11, at the hinge joint 20, prevent said section from moving except in one direction.

After the proper tests have been made for leaks, the air in the bulb 10 will be released to deflate said bulb and permit the same to be removed.

Referring now to the test plug shown in Fig. 3, the numeral 22 indicates an expansible rubber bulb of the same form as the bulb 10 and extending axially through the ends thereof is a tube 23 having two independent air delivery conduits 24 and 25, the former of which opens into the bulb 22 for charging the same, and the latter of which opens into the pipe 4 beyond the test plug for charging said pipe.

Radially extended nipples 26 and 27 are screwed into bossed openings in the outer end portion of the tube 23, outward of the bulb 22, and open, respectively, into the conduits 24 and 25, respectively. Hose sections 28 and 29 are attached to the nipples 26 and 27, respectively, and have at their outer ends independent cut-off valves 30 and 31, respectively. The casing of these cut-off valves 30 and 31 have screw-threaded outer ends to which may be attached suitable mechanism for supplying air under the desired pressure through the conduit 24 to expand the bulb 22 and cause the same to be pressed against the internal wall of the pipe 4 and form a tight joint and to supply air to the pipe 4 through the conduit 25 to test the joints in said pipe for leaks. Segmental heads 32 have screw-threaded engagement with the tube 23 within the bulb 22 to hold the ends thereof properly spaced, and nuts 33 and cooperating washers 34 have screw-threaded engagement with the outer end portions of the tube 23 and clamp the bulb 22 onto the heads 32. After the desired air pressure has been introduced into the bulb 22 and pipe 4, the valves 30 and 31 are independently closed, and after the proper tests have been made, these valves will be opened to release the air pressure in the pipe 4 and in the bulb 22. After the air pressure is released from the bulb 22 the same may be readily removed from the pipe 3.

What we claim is:

A test plug including an expansible bulb adapted to be placed in a pipe, a tube extending through the bulb and provided with two air-charging conduits, one of which opens into the bulb for expanding the same, and the other of which opens into the pipe in which the test plug is applied, said two conduits being independently valve controlled.

In testimony whereof we affix our signatures.

EDWIN G. EVENSTA.
HENRY J. ANDERSON.